US009756663B2

(12) United States Patent
Kim et al.

(10) Patent No.: US 9,756,663 B2
(45) Date of Patent: Sep. 5, 2017

(54) METHOD FOR RECEIVING SERVICE AT USER EQUIPMENT IN WIRELESS COMMUNICATION SYSTEM AND APPARATUS FOR THE SAME

(71) Applicant: LG ELECTRONICS INC., Seoul (KR)

(72) Inventors: Sangwon Kim, Anyang-si (KR); Sungduck Chun, Anyang-si (KR); Seungjune Yi, Anyang-si (KR); Sunghoon Jung, Anyang-si (KR); Youngdae Lee, Anyang-si (KR); Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 389 days.

(21) Appl. No.: 13/669,041

(22) Filed: Nov. 5, 2012

(65) Prior Publication Data

US 2013/0114405 A1 May 9, 2013

Related U.S. Application Data

(60) Provisional application No. 61/555,487, filed on Nov. 4, 2011, provisional application No. 61/556,784, filed on Nov. 7, 2011.

(51) Int. Cl.

| | |
|---|---|
| ***H04W 76/00*** | (2009.01) |
| ***H04W 48/02*** | (2009.01) |
| ***H04W 72/12*** | (2009.01) |
| ***H04H 20/65*** | (2008.01) |

(52) U.S. Cl.
CPC ......... *H04W 76/002* (2013.01); *H04W 48/02* (2013.01); *H04H 20/65* (2013.01); *H04W 72/1257* (2013.01)

(58) Field of Classification Search
CPC ........... H04W 76/002; H04W 72/1257; H04W 72/00; H04W 48/02; H04H 20/65
See application file for complete search history.

(56) References Cited

U.S. PATENT DOCUMENTS

| | | | | |
|---|---|---|---|---|
| 2006/0130147 | A1* | 6/2006 | Von-Maszewski | H04L 63/1408 726/25 |
| 2007/0207805 | A1* | 9/2007 | Pallares Lopez | H04W 36/0033 455/436 |
| 2007/0250882 | A1* | 10/2007 | Da Palma | G06F 11/3684 725/105 |
| 2009/0147795 | A1* | 6/2009 | Mevissen | H04L 29/06 370/401 |
| 2011/0141908 | A1* | 6/2011 | Ishida | H04W 48/02 370/241 |
| 2012/0033554 | A1* | 2/2012 | Shiva | H04W 28/0205 370/235 |
| 2012/0178436 | A1* | 7/2012 | Fan | H04W 76/027 455/422.1 |

(Continued)

*Primary Examiner* — Walter DiVito
*Assistant Examiner* — Anthony Luo
(74) *Attorney, Agent, or Firm* — Dentons US LLP

(57) ABSTRACT

A method for receiving MBMS (Multimedia Broadcast Multicast Service) service at a user equipment camping on a first frequency in a wireless communication system is disclosed. The method comprises receiving the MBMS on a second frequency without camping on the second frequency from a network, if being able to receive the MBMS on the second frequency while camping on the first frequency.

6 Claims, 13 Drawing Sheets

(56) References Cited

U.S. PATENT DOCUMENTS

| | | | | |
|---|---|---|---|---|
| 2013/0044668 | A1* | 2/2013 | Purnadi ............. | H04W 36/0055 370/312 |
| 2014/0010142 | A1* | 1/2014 | Ranta-Aho ....... | H04W 36/0061 370/312 |

* cited by examiner (a) Control-plane protocol stack (b)User-plane protocol stack

METHOD FOR RECEIVING SERVICE AT USER EQUIPMENT IN WIRELESS COMMUNICATION SYSTEM AND APPARATUS FOR THE SAME

This application claims the benefit of priority of U.S. Provisional Application Nos. 61/555,487, filed Nov. 4, 2011, and 61/556,784, filed Nov. 7, 2011, which are incorporated by reference in their entirety herein.

TECHNICAL FIELD

The present invention relates to a wireless communication system, and more particularly, to a method of receiving a service at a user equipment (UE) in a wireless communication system and an apparatus for the same.

BACKGROUND ART

As an example of a wireless communication system to which the present invention is applicable, a 3$^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3$^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies on a method of receiving a service at a user equipment (UE) in a wireless communication system and an apparatus for the same.

Technical Solution

To achieve these objects and other advantages and in accordance with the purpose of the invention, as embodied and broadly described herein, a method for receiving MBMS (Multimedia Broadcast Multicast Service) service at a user equipment camping on a first frequency in a wireless communication system comprises if being able to receive the MBMS on a second frequency while camping on the first frequency, receiving the MBMS on the second frequency without camping on the second frequency from a network.

Further, the method may further comprises if being not able to receive the MBMS on the second frequency while camping on the first frequency, configuring the second frequency to be the highest priority in reselection priorities; performing a cell reselection based on the configured reselection priorities; and receiving the MBMS on the second frequency from the network.

Also, the method may further comprises receiving information on reselection priorities for at least one of the plurality of frequencies from the network.

Preferably, the method further comprises receiving information on the second frequency from a network.

Here, the user equipment is in an RRC (radio resource control) idle mode.

More preferably, whether being able to receive the MBMS on the second frequency while camping on the first frequency depends on a carrier aggregation capability of the user equipment.

Also, whether being able to receive the MBMS on the second frequency while camping on the first frequency depends on a multiple RAT (Radio Access Technology) receiving capability of the user equipment.

Also, the first frequency is a serving frequency and the second frequency is a non-serving frequency.

Also, if being able to receive the MBMS on a second frequency while camping on the first frequency, the user equipment includes a first receiver for the first frequency and a second receiver for the second frequency.

In another aspect of the present invention, a method for receiving MBMS (Multimedia Broadcast Multicast Service) service at a user equipment in a wireless communication system is disclosed. The method comprises receiving a MBMS wait time from a network when a RRC (Radio Resource Control) connection is released; and performing a RRC connection establishment procedure when the MBMS wait time is expired, if a MBMS reception is ongoing.

Also, the method further comprises performing the RRC connection establishment procedure when the MBMS reception stops.

Also, the method further comprises performing the RRC connection establishment procedure when a unicast service is prioritized over MBMS.

Advantageous Effects

According to the embodiment of the present invention, a base station can efficiently provide a multimedia broadcast multicast service (MBMS) to a user equipment (UE).

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

The configuration, operation and other features of the present invention will be understood by the embodiments of the present invention described with reference to the accompanying drawings. The following embodiments are examples of applying the technical features of the present invention to a 3$^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
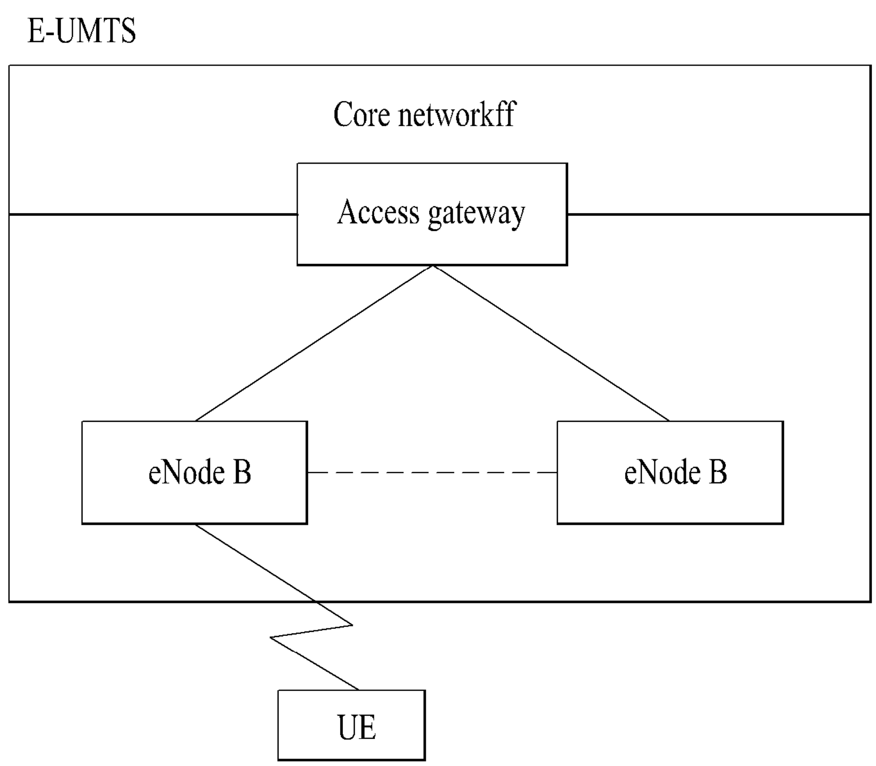
FIG. 1 is a diagram showing a network structure of an Evolved Universal Mobile Telecommunications System (E-UMTS) as an example of a wireless communication system.
Figure 2:
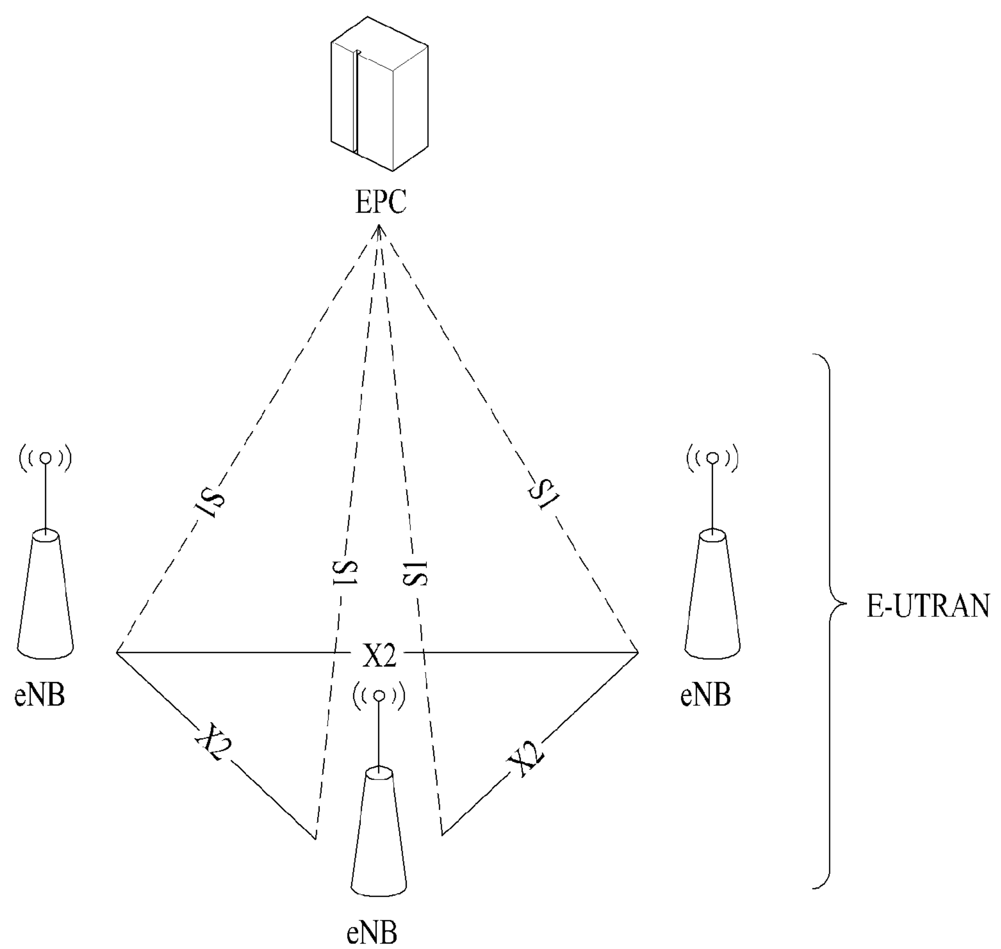
FIG. 2 is a diagram showing the concept of a network structure of an Evolved Universal Terrestrial Radio Access Network (E-UTRAN)

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes eNBs and eNBs are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
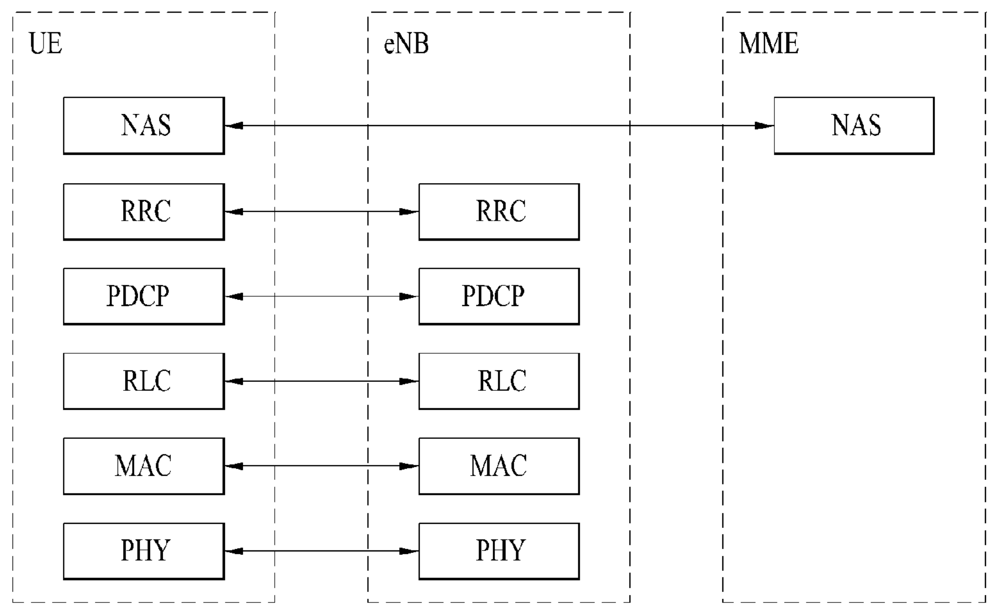
FIG. 3 is a diagram showing a control plane and a user plane of a radio interface protocol architecture between a User Equipment (UE) and an Evolved Universal Terrestrial Radio Access Network (E-UTRAN) based on a 3$^{rd}$ Generation Partnership Project (3GPP) radio access network standard.
Figure 3:
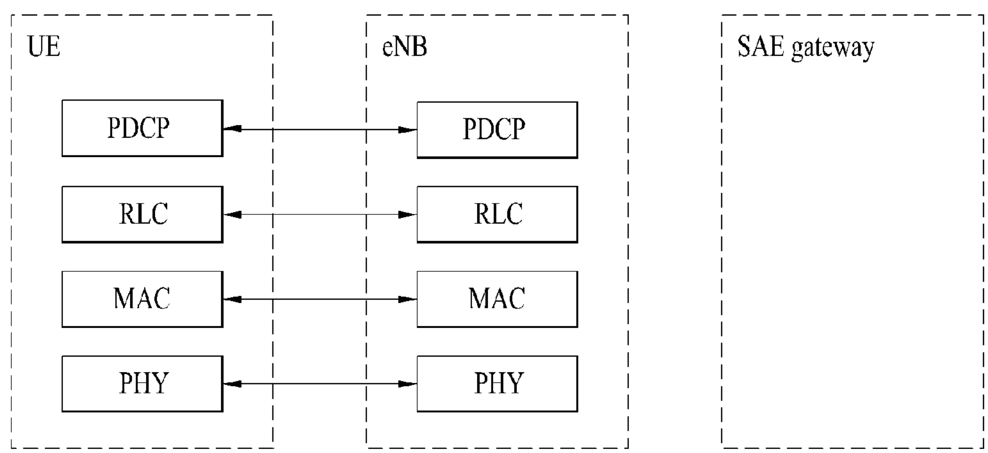

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
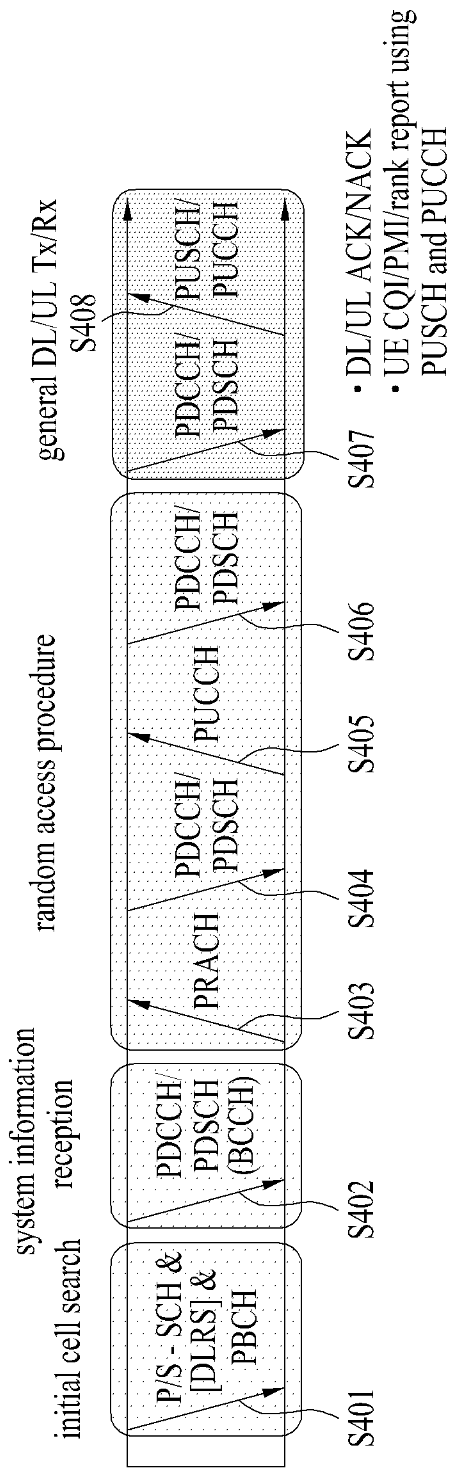
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message of the preamble through the PDCCH and the PDSCH corresponding thereto (S404). In the case of contention-based RACH, a contention resolution procedure may be further performed.

The UE which performs the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 5:
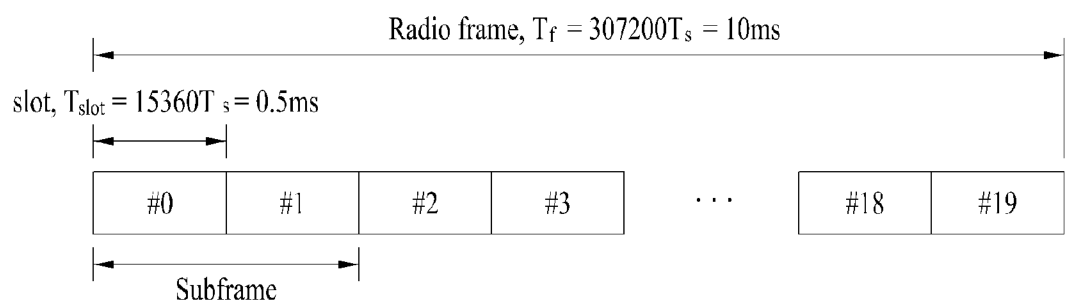
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms ($327200\times T_s$) and includes 10 subframes with the same size. Each of the subframes has a length of 1 ms and includes two slots. Each of the slots has a length of 0.5 ms ($15360\cdot T_s$). $T_s$ denotes a sampling time, and is represented by $T_s=1/(15\ \text{kHz}\times 2048)=3.2552\times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Hereinafter, an RRC state of a UE and an RRC connection method will be described. The RRC state indicates whether the RRC layer of the UE is logically connected to the RRC layer of the E-UTRAN, is referred to as an RRC_CONNECTED state if connected, and is referred to as an RRC_IDLE state if not connected.

Since the E-UTRAN can check presence of the UE of the RRC_CONNECTED state in cell units, it is possible to efficiently control the UE. In contrast, the E-UTRAN cannot check presence of a UE of the RRC_IDLE state and a core network (CN) manages the UE of the RRC_IDLE state in a tracking area (TA) unit which is greater than a cell. That is, the RRC_IDLE state of the UE should transition to the RRC_CONNECTED state in order to receive a service, such as voice or data.

In particular, when a user initially turns a UE on, the UE first searches for an appropriate cell and camps on the cell in an RRC_IDLE state. When RRC connection needs to be established, the UE which is in the RRC_IDLE state is RRC connected to the E-UTRAN via an RRC connection procedure so as to transition to the RRC_CONNECTED state. For example, if uplink data transmission is necessary due to call connection attempt of a user or if a response message is transmitted in response to a paging message received from the E-UTRAN, the UE which is in the idle state needs to be RRC connected to the E-UTRAN.

Figure 6:
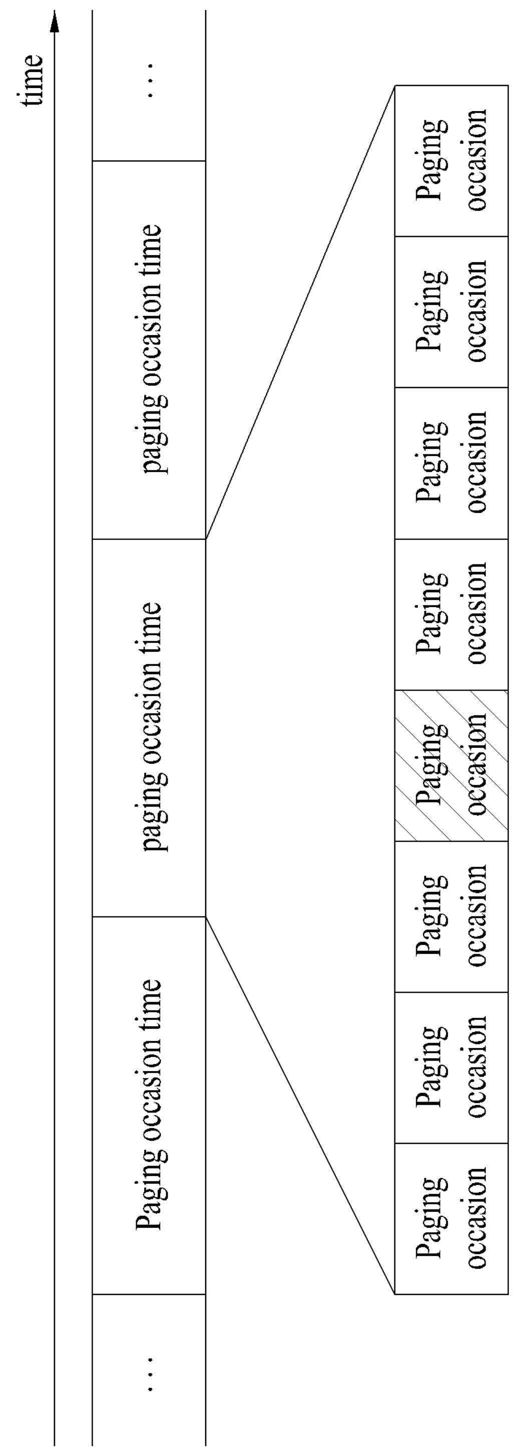
FIG. 6 is a diagram illustrating a general transmission and reception method using a paging message.

FIG. 6 is a diagram illustrating a general transmission and reception method using a paging message.

Referring to FIG. 6, the paging message includes a paging recording including a paging cause and a UE identity. When the paging message is received, the UE may perform discontinuous reception (DRX) for the purpose of reducing power consumption.

More specifically, a network configures several paging occasions (POs) in every time cycle called a paging DRC cycle and a specific UE receives only a specific paging occasion and acquires a paging message. The UE does not receive a paging channel in occasions other than the specific occasion and may be in a sleep state in order to reduce power consumption. One paging occasion corresponds to one TTI.

The eNB and the UE use a paging indicator (PI) as a specific value indicating transmission of a paging message. The eNB may define a specific identity (e.g., paging-radio network temporary identity (P-RNTI) as the PI and inform the UE of paging information transmission. For example, the UE awakes each DRX cycle and receives one subframe in order to check whether a paging message is received. If a P-RNTI is present in an L1/L2 control channel (PDCCH) of a subframe received by the UE, the UE may confirm that a paging message is present in a PDSCH of the subframe. In addition, if the identity (e.g., IMSI) of the UE is present in the paging message, the UE responds to the eNB (e.g., receives RRC connection or system information) and receives a service from the eNB.

Next, system information will be described. The system information includes essential information necessary to connect a UE to an eNB. Accordingly, the UE should receive all system information before being connected to the eNB and always have new system information. Since all UEs located in a cell should know system information, the eNB periodically transmits the system information.

The system information may be divided into a master information block (MIB), a scheduling block (SB) and a system information block (SIB). The MIB enables a UE to become aware of a physical configuration of a cell, for example, a bandwidth. The SB indicates transmission information of SIBs, for example, a transmission period. The SIB is a set of associated system information. For example, a specific SIB includes only information about peripheral cells and another SIB includes only information about an uplink radio channel used by a UE.

Hereinafter, a cell selection and cell reselection process will be described.

If a UE is powered on, the UE selects a cell having appropriate quality and performs a preparation procedure for receiving a service. A UE in an RRC_IDLE state should always select appropriate quality and prepare to receive a service from the cell. For example, a UE which is just turned on should select a cell having appropriate quality in order to perform registration with a network. If a UE in an RRC_CONNECTED state enters an RRC_IDLE state, the UE should select a cell on which the UE will camp in the RRC_IDLE state. A process of, at a UE, selecting a cell satisfying a specific condition in order to camp on the cell in a service standby state such as an RRC_IDLE state is referred to as cell selection. Since cell selection is performed in a state in which the UE does not determine a cell on which the UE camps in the RRC_IDLE state, it is important to select a cell as fast as possible. Accordingly, a cell which provides radio signal quality equal to or greater than a predetermined reference may be selected in the cell selection process of the UE, although the cell does not provide the best radio signal quality to the UE.

If a UE selects a cell satisfying a cell selection reference, the UE receives information necessary for operation of the UE in an RRC_IDLE state in the cell from system information of the cell. The UE receives all information necessary for operation of the RRC_IDLE state and then requests a service from a network or a waits reception of a service from the network in the RRC_IDLE state.

After a UE selects a certain cell in a cell selection process, the intensity or quality of a signal between the UE and an eNB may be changed due to mobility of the UE or wireless environment change. Accordingly, if the quality of the selected cell deteriorates, the UE may select another cell which provides better quality. If the cell is reselected, a cell which provides better signal quality than that of a currently selected cell is generally selected. Such a process is referred to as cell reselection. The cell reselection process is performed in order to select a cell which provides the best quality to the UE from the viewpoint of the quality of the radio signal. In addition to the quality of the radio signal, the network may set priority per frequency and inform the UE of the priority. The UE which receives the priority preferentially takes the priority into consideration, rather than radio signal quality.

Hereinafter, carrier aggregation (CA) of an LTE-A system will be described.

Figure 7:
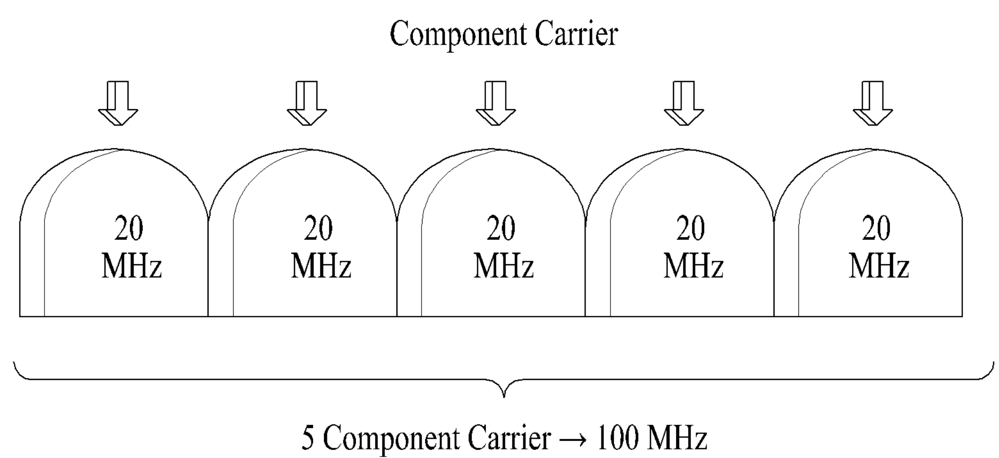
FIG. 7 is a diagram showing the concept of a carrier aggregation scheme of an LTE-A system.

FIG. 7 is a diagram showing the concept of a carrier aggregation scheme of an LTE-A system.

The LTE-A technology standard is IMT-Advanced candidate technology of the International Telecommunication Union (ITU) and is designed to suit the requirements of the IMT-Advanced technology of the ITU. In LTE-A, in order to satisfy the requirements of the ITU, extension of a bandwidth of the existing LTE system is being discussed. In the LTE-A system, in order to extend the bandwidth, a carrier of the existing LTE system is defined as a Component Carrier (CC) and a method of aggregating and utilizing a maximum of five CCs is being discussed. For reference, a serving cell may include one downlink CC and one uplink CC. Alternatively, a serving cell may include one downlink CC. Since the CC may have a maximum bandwidth of 20 MHz as in the LTE system, the bandwidth may extend to 100 MHZ at maximum. Technology for aggregating a plurality of CCs is referred to as carrier aggregation.

If a CA scheme is applied, one RRC connection is present between a UE and a network. Among a plurality of serving cells configured to be used by a UE, a serving cell which provides security input and mobility information of a Non-Access Stratum (NAS) layer in order to establish or reestablish RRC connection is referred to as a primary serving cell (PCell) and the other cells are referred to as secondary serving cells (SCell).

Hereinafter, a multimedia broadcast multicast service (MBMS) will be described. The MBMS refers to a service for simultaneously transmitting a multimedia data packet to a plurality of UEs as a broadcast/multicast service. The "broadcast/multicast service" or "MBMS" used in the present specification is replaced with the term "point-to-multipoint service" or "multicast and broadcast service (MBS)". The MBMS is based on IP multicast in which UEs share resources necessary to transmit a data packet and receive the same multimedia data. Accordingly, if UEs capable of using the MBMS are present in the same cell, it is possible to increase resource efficiency. Since the MBMS is not related to an RRC connection state, a UE in an idle state may also receive the service.

Figure 8:
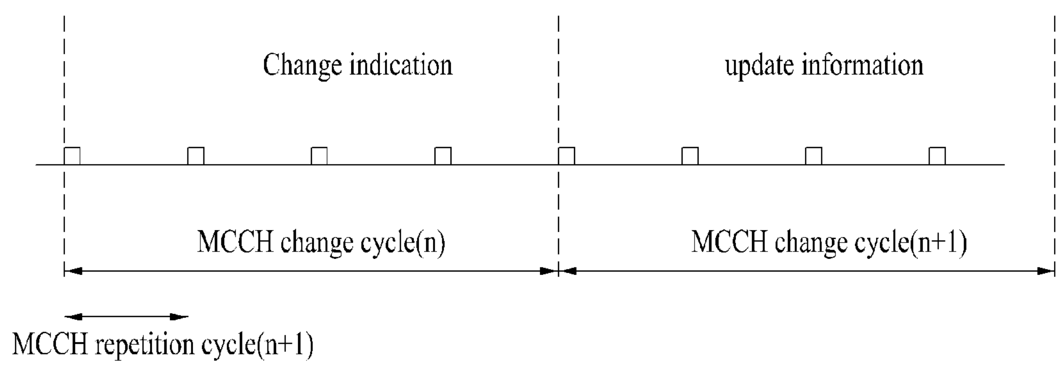
FIG. 8 is a diagram showing a scheme for transmitting multimedia broadcast multicast service (MCCH) information.

An MBMS control channel (MCCH) or an MBMS traffic channel (MTCH) which is a logical channel for an MBMS may be mapped to an MBMS channel (MCH) which is a transport channel. The MCCH transmits an RRC message including common control information of an MBMS and the MTCH transmits traffic of a specific MBMS. One MCCH is present in one MBMS single frequency network (MBSFN) region for transmitting the same MBMS information or traffic. If a plurality of MBSFN regions is provided in one cell, a UE may receive a plurality of MCCHs. FIG. 8 is a diagram showing a scheme for transmitting MCCH information.

Referring to FIG. 8, if an MBMS-associated RRC message is changed in a specific MCCH, a PDCCH transmits a MBMS-radio network temporary identity (M-RNTI) and an MCCH indicator indicating the specific MCCH. A UE supporting an MBMS may receive the M-RNTI and the MCCH indicator via the PDCCH, checks that the MBMS-associated RRC message has been changed in the specific MCCH, and receive the specific MCCH. The RRC message of the MCCH may be changed according to change cycle and may be repeatedly broadcast each repetition cycle.

The UE may receive a dedicated service while receiving an MBMS. For example, a certain user may chat using an instant messaging (IM) service while watching TV via an MBMS. In this case, the MBMS is provided via an MTCH received by several UEs together and a service individually provided to each UE, such as an IM service, is provided via a dedicated bearer such as a DCCH or a DTCH.

In addition, an eNB may simultaneously use several frequencies in one region. In this case, a network may select one of several frequencies, provide an MBMS only at the frequency and provide a dedicated bearer to each UE at all different frequencies, in order to efficiently use radio resources. In this case, if a UE which has received a service at a dedicated bearer at a frequency which does not provide an MBMS wishes to receive an MBMS, the UE should perform handover to a frequency which provides an MBMS.

The UE transmits an MBMS interest indication to an eNB. That is, if the UE wishes to receive an MBMS, the UE transmits an interest indication to the eNB and the eNB recognizes that the UE wishes to receive the MBMS if the interest indication is received and moves the UE to a frequency which provides an MBMS. Here, the MBMS interest indicator means that the UE wishes to receive the MBMS and additionally includes information about to which frequency the UE wishes to move.

In the related art, the UE which wishes to receive a specific MBMS checks frequency information and broadcast time information of the specific service. If the MBMS has already been broadcast or if the MBMS will immediately start to be broadcast, the UE configures a frequency which provides the MBMS as highest priority. The UE performs a cell reselection procedure using reconfigured frequency priority information so as to move to a cell providing the MBMS and receives the MBMS.

As described above, in the related art, a UE configures a non-serving frequency as highest cell reselection priority in order to receive an MBMS at the non-serving frequency.

Hereinafter, service continuity will be described.

Service continuity is the process whereby the UE can continue to receive the MBMS via MBSFN when changing cell. The frequencies used to provide MBMS may change from one geographic area to another within a PLMN. E-UTRAN procedures provide support for service continuity with respect to mobility within the same MBSFN area (same frequency layer).

In RRC_IDLE, the UE which is receiving MBMS via MBSFN autonomously makes the frequency providing MBMS the highest priority when performing cell reselection Further, in RRC_IDLE, the UE is provided with information about which services are provided in neighbouring cells belonging to MBMS frequencies.

The UE that are receiving MBMS in RRC_IDLE state performing cell reselection or are in RRC_CONNECTED state obtains target cell MTCH information from the target cell MCCH.

In RRC_CONNECTED, the network is informed via a RRC message about the UE's interest in MBMS (which services it is receiving and/or is interested to receive) and the network does its best to ensure that the UE is able to receive MBMS and unicast services subject to the UE's capabilities.

The E-UTRAN reuses the SupportedBandCombination IE to derive the UEs MBMS related reception capabilities, i.e. the E-UTRAN tries to ensure the UE is able to receive MBMS and unicast bearers by by providing them on the frequencies indicated in SupportedBandCombination signaled by the UE.

Simultaneous use of MBMS service and unicast service will be common. However, operators have limited set of frequency bands. Thus, when operators provide MBMS, they will carefully plan which frequency layer will provides MBMS. Even though operators try to disperse cell loads over multiple frequencies, as long as operators do not provides a same popular MBMS over multiple frequencies, many users will be on the one MBMS frequency layer. This will result in congestion on a MBMS cell.

In general, for non-MBMS UEs, the network can use either user-dedicated cell-camping priority information or SIB (system information block) based cell-camping priorities. Through this cell-camping priority information, the eNB can distribute the UEs over multiple frequencies. However, for MBMS UE, as long as UEs are intending to receive MBMS, the network cannot distribute the UEs.

When a cell without the MBMS is congested, it is probable that all the neighboring cells also are congested. On the other hand, when a cell with the MBMS is congested, it is probable that all the neighboring cells are not congested.

When the MBMS cell is congested, a UE will probably get a unicast service as soon as the UE moves to other non-MBMS cell.

When eNB makes a decision to release RRC connection toward a certain UE, it's because the user prioritized a MBMS rather than other unicast service.

But this user's preference can dynamically change. The fact that user prioritized a MBMS service over unicast service at the time when eNB made the decision to release does not mean that the user always prefers MBMS service over unicast service. After the UE transits from RRC Connected mode to RRC Idle mode, the user can change his preference.

After returning to RRC Idle mode, a UE can initiate a unicast service which a user prioritizes over MBMS. In this case, following scenarios can be considered:

Scenario 1

1. UE is using unicast service A. At the same time, the UE is receiving MBMS Service B.
2. A MBMS cell becomes congested.
3. User prioritizes MBMS service B over unicast service A.
4. eNB releases RRC connection toward the UE.
5. The UE stays in RRC Idle mode.
6. User starts another unicast service B.

In this scenario 1, as long as the UE prefers MBMS service over unicast service, the UE should not try RRC Connection Establishment. Because the UE prefers MBMS service, if the unicast service be provided, it will be over the MBMS cell where congestion is ongoing. Because eNB does not have capacity in this case, the RRC connection will be released again. Not to complicate the situation, the UE should not try RRC connection.

However, if a user prefers unicast service B over MBMS service, there should be no restriction for the UE's attempt for RRC Connection Establishment. After the RRC connection establish, the eNB can move the UE to other frequency because the UE does not prefer MBMS services. This would be similar to the situation where a UE stays in RRC Idle mode.

Scenario 2

1. UE is in RRC Idle mode.
2. A MBMS service D starts. The UE still is in RRC Idle mode.

3. The MBMS cell becomes congested.

4. A user starts to use a unicast service E.

In this scenario 2, the UE has never been in RRC Connected mode. This UE stays in a congested MBMS cell because the user wants to receive MBMS. If the user's desire to receive MBMS is not strong, it means that the user is ready to give up MBMS reception to get unicast service access. For this UE, if the user starts RRC Connection Establishment procedure for the MBMS cell, the UE will be moved to non-MBMS cell as soon as the RRC connection is established.

<First Embodiment>

For a UE which is receiving a MBMS service but does not prioritize MBMS service over unicast service, the UE should be allowed to access a cell. Therefore, in the first embodiment of the present invention, following methods are suggested.

1) First method is for eNB to indicate to UEs whether MBMS receiving UE can access to eNB or not. If the indication allows MBMS receiving UE's access to a cell, the MBMS receiving UE can start RRC Connection Establishment procedure. Regardless of the indication, the non-MBMS receiving UE can start RRC Connection Establishment procedure.

If the indication does not allow MBMS receiving UE's access to a cell, the UE cannot start RRC Connection Establishment procedure. In this case, the UE does not prioritize MBMS frequency in the camping priority. Therefore, the UE should moves to other frequency, to start RRC Connection establishment.

2) Second method is for eNB to indicate to UEs whether MBMS receiving UE should perform access to network through other non-MBMS frequency.

If the indication states that the UE should start MBMS access through other frequency, the UE moves to other frequency when it wants to start RRC Connection establishment procedure.

If the indication does not state that the UE should start MBMS access through other frequency, the UE starts RRC Connection establishment procedure through the MBMS cell when it wants to start RRC Connection establishment procedure.

3) Third method is for eNB to indicate to UEs whether the MBMS receiving UE can access to eNB only when it prioritizes unicast over MBMS.

If the indication allows MBMS receiving UE's access to a cell only when the UE prioritizes unicast over MBMS, the UE which prioritize unicast can start RRC Connection Establishment procedure.

If the indication allows MBMS receiving UE's access to a cell only when the UE prioritizes unicast over MBMS, the UE which does not prioritize unicast cannot start RRC Connection Establishment procedure. In this case, the UE does not prioritize MBMS frequency in the camping priority. And the UE moves to other frequency, to start RRC Connection establishment.

4) Fourth method is for eNB to include MBMS wait time when it releases a RRC connection of a UE which prioritized MBMS over unicast. MBMS wait time defines how long a UE cannot perform a RRC Connection establishment procedure after RRC connection release.

If the UE receives the MBMS wait time, it does not try RRC Connection as long as MBMS reception is ongoing. Or, if the UE receives the MBMS wait time, it does not try RRC Connection as long as MBMS reception is preferred over unicast service.

Otherwise, for example, if a UE moves to other MBMS frequency or if a UE stops MBMS reception or if the unicast service is prioritized over MBMS or if the MBMS wait time is expired, the UE is allowed to start RRC Connection Establishment procedure on a MBMS cell or on a MBMS frequency.

Figure 9:
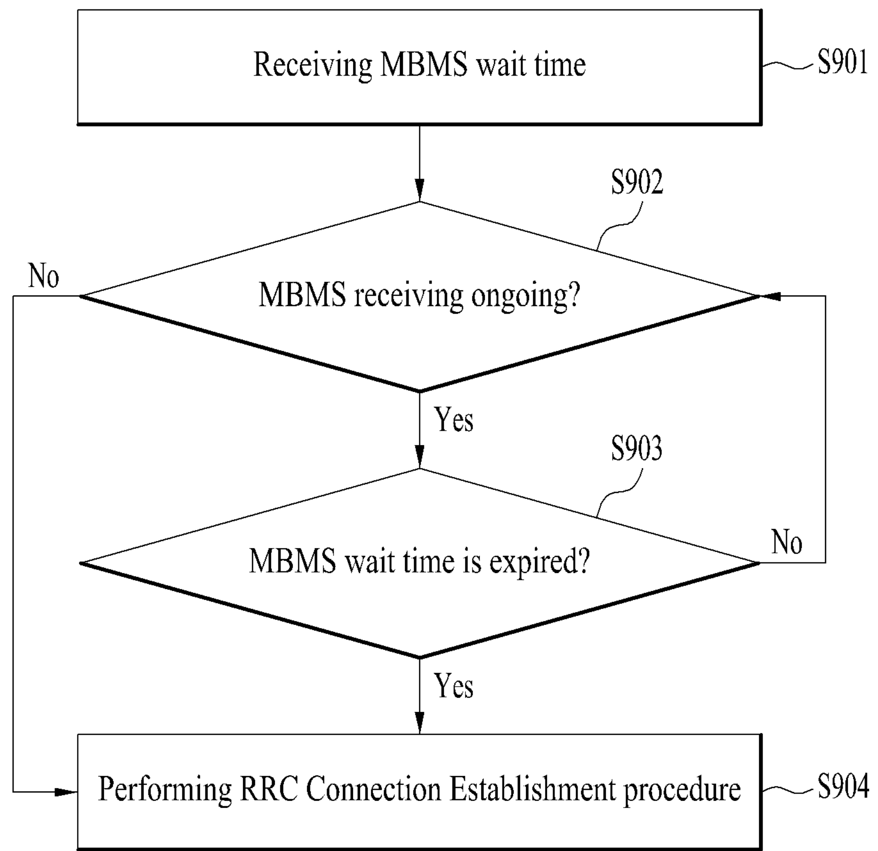
FIG. 9 is a flowchart illustrating a method of receiving an MBMS in consideration of the MBMS wait time according to the first embodiment of the present invention

FIG. 9 is a flowchart illustrating a method of receiving an MBMS in consideration of the MBMS wait time according to the first embodiment of the present invention.

Referring to FIG. 9, firstly, in step 901, the UE receives the MBMS wait time. Here, the MBMS wait time can be received during a RRC connection release procedure.

Next, in step 902, the UE may determine whether the MBMS reception is ongoing or whether the MBMS reception is preferred over the unicast service. If the MBMS reception is not ongoing or if the unicast service is prioritized over MBMS, the UE is allowed to start the RRC Connection Establishment procedure on the MBMS cell or on the MBMS frequency in step 904.

However, if the MBMS reception is ongoing, in step 903, the UE may determine whether the MBMS wait time is expired. When MBMS wait time is not expired, the UE should receive the MBMS without performing the RRC Connection Establishment procedure unless the UE moves to other MBMS frequency or the UE stops the MBMS reception or the unicast service is prioritized over the MBMS.

In the other hand, when MBMS wait time is expired, the UE is allowed to start the RRC Connection Establishment procedure on the MBMS cell or on the MBMS frequency in step 904.

<Second Embodiment>

One of assumptions for LTE system is that user may use different kind of services simultaneously. A user may use web-browsing service or streaming service while he/she is receiving a MBMS service. Simple example is that a user is reading newspaper over the internet with unicast bearer while he is listening to a radio channel through MBMS bearer. Or, a user is using a voice call service while the user is looking at TV news over MBMS bearer with muted sound. As capabilities of mobile phones are increasing and smart phones with multi-tasking capable are used for wide range of purposes, these examples will occur more frequently.

For a UE which is interested in receiving MBMS service which is soon going to start, the UE will make the frequency layer which provides the MBMS service the highest priority frequency. As result of this priority handling, UE will eventually moves from the current cell to the MBMS-providing cell.

When a UE moves from one cell to other cell, UE decodes SIBs and forward PLMN and Tracking Area information to upper layer. If upper layer decides a need to perform TA Update, RRC connection establishment procedure is initiated at RRC layer. If a cell where a MBMS service is provided has a different TAC than the TAC of the cell where the UE originally camped on, the starts of a MBMS service will trigger simultaneous TAU from multiple UEs. Also, as the number of UE camping on a cell increases, the number of paging in that cell also will increase. As the number of UE and paging increases, UEs in that cell will have to wake up more frequently due to the increased paging.

For a UE which is not capable of Carrier Aggregation, the UE should have no other choice but to move to the cell where MBMS service is provided. However, for a UE which is capable of Carrier Aggregation, there is no need for a UE to move from current cell to the MBMS cell. I.e., while the CA-capable UE remains on the current cell, the CA-capable UE activates another receiver chain to receive a MBMS service which is provided on other carrier than the current camped-on carrier. I.e., when a MBMS service starts on other frequency, the CA capable UE in Idle mode does not changes PCell and implicitly activates another receiver chain to receive the MBMS service on other frequency.

There will be no impact to the UE behavior toward PCell. But by making UE to camping on the same cell regardless of the start of MBMS, the increase of the paging load and the TAU signaling load on the MBMS layer can be minimized. This in turns reduces the radio resource use of MBMS cell which is prone to resource shortage problem.

It is proposed that CA-Capable UE does not its camping priority regardless of MBMS reception status. This UE receives MBMS service over the MBMS carrier by implicitly activating additional receiver chain. Or, if a UE can receive a MBMS service which is provided by other frequency without camping on the cell, the UE does not perform cell reselection toward that cell.

Figure 10:
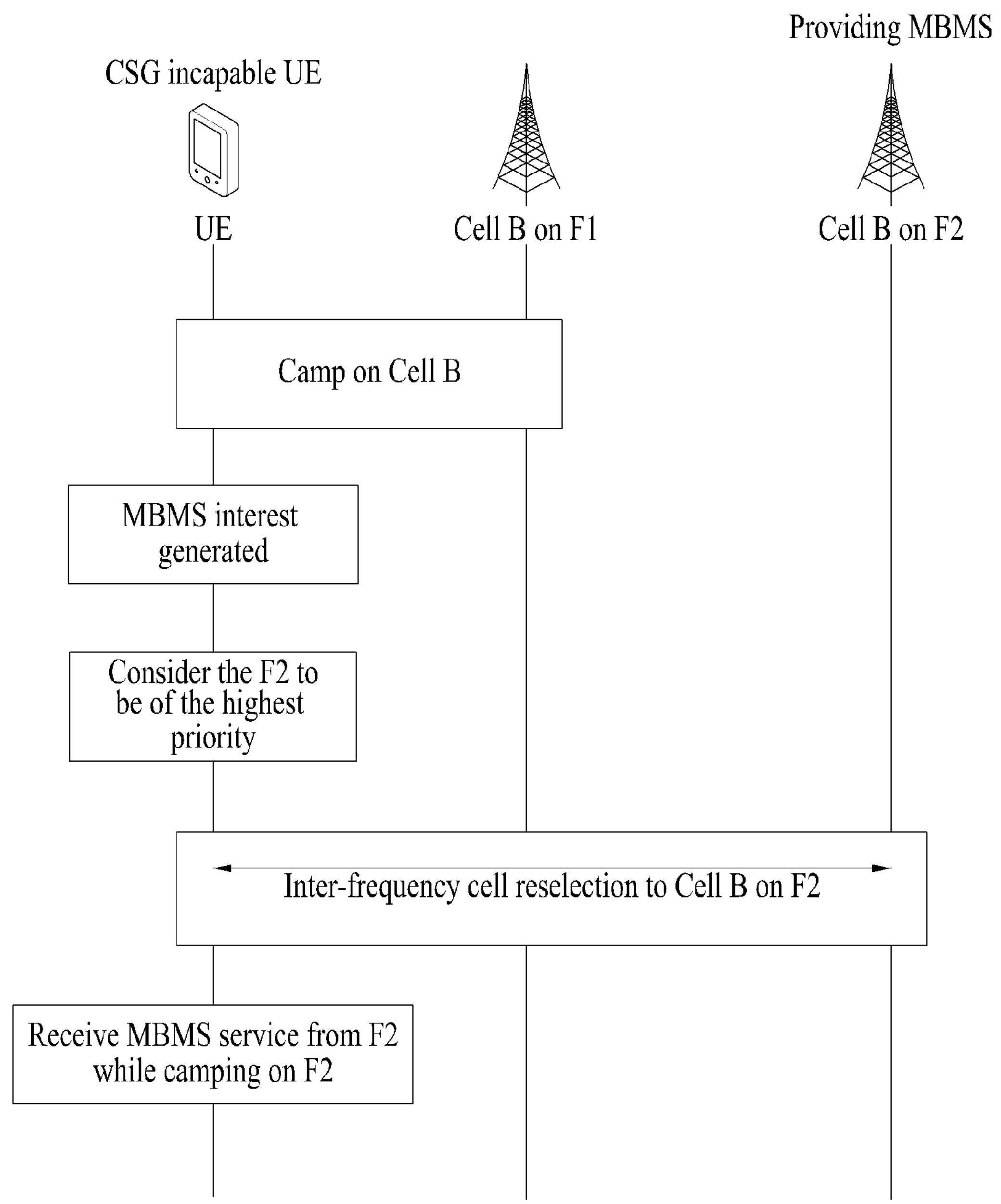
FIG. 10 is a diagram showing a method of reconfiguring priority of a frequency of a UE according to MBMS reception in the related art.

FIG. 10 is a diagram showing a method of reconfiguring priority of a frequency of a UE according to MBMS reception in the related art.

Referring to FIG. 10, a UE camping on a serving frequency F1 configures a non-serving frequency F2 as highest priority in order to receive an MBMS provided at F2 and thus performs inter-frequency cell reselection at the non-serving frequency F2. The UE receives the MBMS in the corresponding cell while camping on a cell of the non-serving frequency F2.

However, all UEs do not necessarily need to move to a cell providing an MBMS in order to receive the MBMS. A UE capable of simultaneously receiving data from a plurality of carriers, such as a UE supporting a CA scheme, may receive an MBMS, which is being provided at a non-serving frequency, using another receiver. However, in the related art, since all UEs which wish to receive an MBMS move to a cell providing the MBMS, the following problems occur.

A UE capable of receiving an MBMS without moving to a cell providing an MBMS performs unnecessary cell reselection. In addition, when the UE moves to another cell, the UE reads an SIB of the cell to which the UE has moved and sends PLMN and tracking area (TA) information to a higher layer. If the higher layer determines that TA update is necessary, an RRC connection establishment procedure starts at an RRC layer. If a cell, to which the UE has moved in order to receive an MBMS, has a TAC different from that of a previous cell, the start of the MBMS will cause a tracking area update (TAU) procedure of numerous UEs. In addition, the number of UEs which camp on a cell providing the MBMS is increased due to UEs which have moved in order to receive the MBMS, thereby increasing cell paging traffic. For frequent paging reception, a UE in an RRC idle state frequently awakes, thereby increasing battery consumption.

Accordingly, when the UE wishes to receive the MBMS provided at the non-serving frequency, it is necessary to reconfigure priority of the frequency used for cell reselection according to receiver capabilities of the UE.

In the present invention, when an idle-mode UE which wishes to receive an MBMS performs a cell reselection procedure, priority of a cell reselection frequency of a frequency at which an MBMS is broadcast is changed according to receiver capabilities of the UE.

More specifically, if the UE wishes to receive an MBMS provided at a non-serving frequency, the UE identifies a frequency at which the MBMS is broadcast. The UE may confirm acquire information about the frequency at which the MBMS is broadcast via system information (SI) or a higher layer (e.g., an application layer).

In addition, the UE determines whether receiver capabilities thereof support reception of an MBMS in a state of camping on a serving cell. If receiver capabilities of the UE support reception of the MBMS, the UE does not reconfigure priority of the frequency received from the network in order to receive the MBMS upon cell reselection. Receiver capabilities of the UE may include carrier aggregation capabilities, E-UTRAN reception capabilities, multiple RAT reception capabilities (simultaneous reception capabilities), etc. Here, E-UTRAN reception capabilities refer to capabilities of the UE capable of simultaneously receiving signals broadcast at a serving frequency and a non-serving frequency using a plurality of receivers. In addition, multiple RAT reception capabilities refer to simultaneous reception capabilities in which the UE may simultaneously receive different RAT signals.

If receiver capabilities of the UE do not support reception of the MBMS when the UE does not camp on a cell providing the MBMS, the UE reconfigures the frequency which provides the MBMS, as highest priority, performs inter-frequency cell reselection based on the reconfigured priority, and camps on a cell providing the MBMS.

However, a UE, receiver capabilities of which support reception of the MBMS in a state in which the UE camps on a serving cell, receives the MBMS using another receiver while continuously camping on the serving cell.

Meanwhile, receiver capabilities of a UE may be supported or may not be supported according to frequency at which an MBMS is broadcast. Accordingly, the UE can determine whether receiver capabilities are supported whenever a new MBMS is received.

Figure 11:
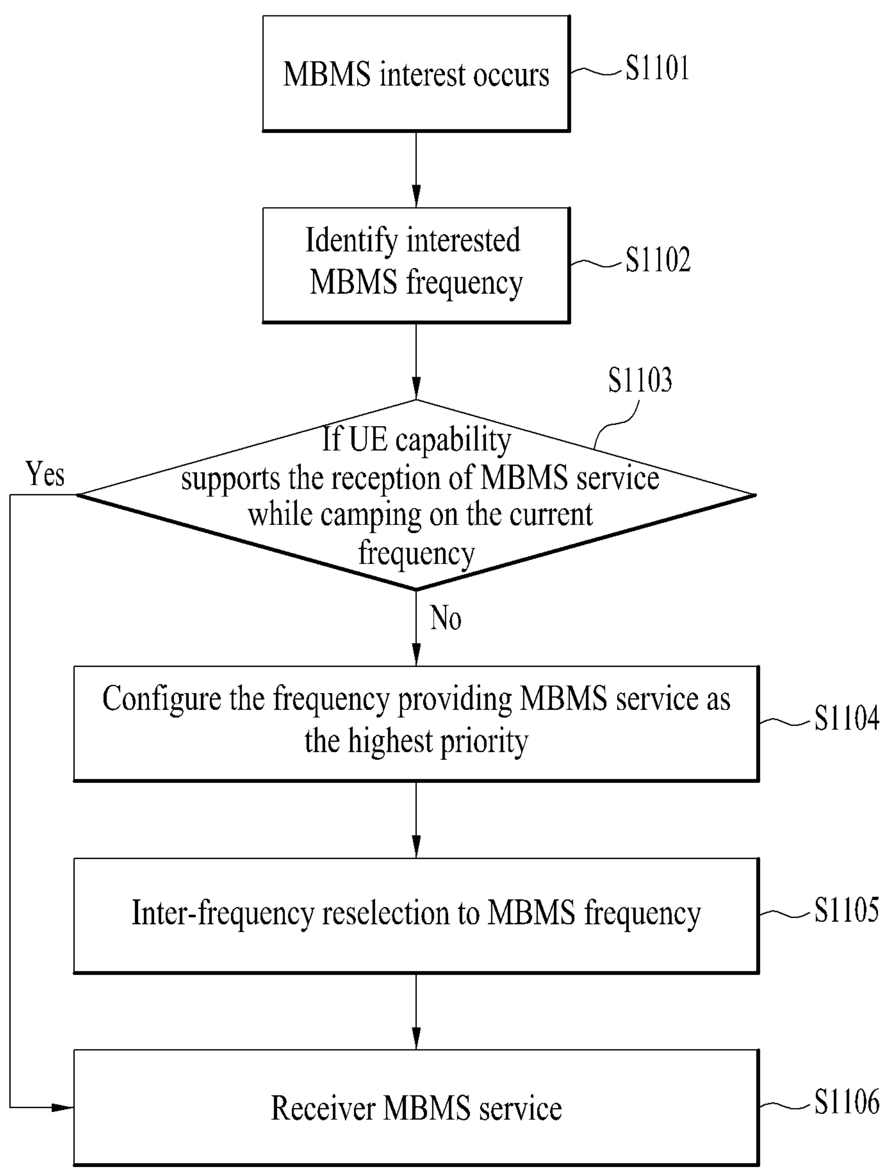
FIG. 11 is a flowchart illustrating a method of receiving an MBMS in consideration of receiver capabilities of a UE according to a second embodiment of the present invention.

FIG. 11 is a flowchart illustrating a method of receiving an MBMS in consideration of receiver capabilities of a UE according to the third embodiment of the present invention.

Referring to FIG. 11, first, in step 1101, if MBMS interest occurs, that is, if a specific MBMS is received or is desired to be received, a frequency which provides the specific MBMS is identified in step 1102. Here, the frequency which provides the MBMS is identified via system information or a higher layer (e.g., an application layer) as described above.

Subsequently, the UE determines whether receiver capabilities of the UE support reception of the MBMS while camping on a serving frequency in step 1103. If supported, in step 1106, the UE receives MBMS using another receiver while continuously camping on the serving frequency.

However, if not supported, in step 1104, the UE reconfigures the frequency which provides the MBMS as highest priority, performs inter-frequency cell reselection based on the reconfigured priority in step 1105, camps on a cell which provides the MBMS, and receives the MBMS in step 1106.

A UE which supports a carrier aggregation scheme considers a frequency band combination supported by the UE in configuration of the cell reselection frequency priority associated with frequency reselection. The UE informs the eNB of the frequency band combination.

If a current serving frequency and a non-serving frequency providing an MBMS are included in the frequency band combination supported by the UE, the UE does not reconfigure the frequency as highest priority and performs the cell reselection procedure, in order to receive the MBMS provided at the non-serving frequency. As a result, the UE may receive the MBMS while camping on the current serving frequency.

If the combination of the serving frequency of the UE and the non-serving frequency providing the MBMS is not included in the frequency band combination supported by the UE, the UE configures the non-serving frequency as highest priority. As a result, the UE performs inter-frequency cell reselection at the frequency providing the MBMS and receives the MBMS.

For example, assume that a UE in which a serving frequency is f1 and a supported frequency band combination is {(f1, f2), (f1, f4), (f3, f4)} receives the MBMS. If the MBMS is provided at f2, since the receiver capabilities of the UE support simultaneous reception of (f1, f2), the UE performs cell reselection without reconfiguring the priority of the frequency. If the MBMS is provided at f3, since the reception capabilities of the UE do not support f3, the UE configures f3 as highest priority and then performs cell reselection in order to receive the MBMS.

Figure 12:
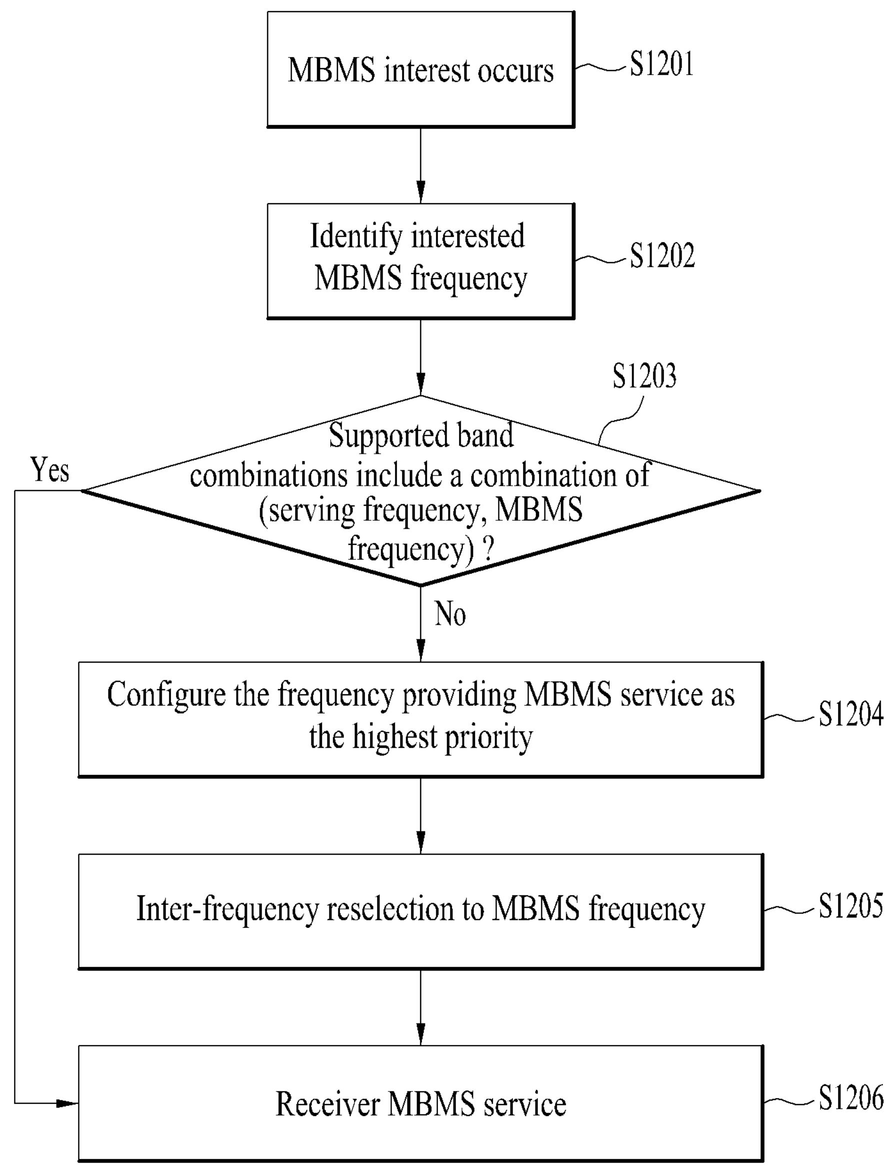
FIG. 12 is a flowchart illustrating a method of receiving an MBMS according to the second embodiment of the present invention.

FIG. 12 is a flowchart illustrating a method of receiving an MBMS according to the third embodiment of the present invention. In particular, FIG. 12 relates to the case in which a determination as to whether the priority of the frequency is reconfigured is made according to the carrier aggregation capabilities of the UE.

Referring to FIG. 12, first, in step 1201, if MBMS interest occurs, that is, if a specific MBMS is received or is desired to be received, a frequency which provides the specific MBMS is identified in step 1202. Here, the frequency which provides the MBMS is identified via system information or a higher layer (e.g., an application layer) as described above.

Subsequently, the UE determines whether the frequency band combination supported by the UE includes a combination of (the serving frequency and the MBMS frequency) in step 1203. If supported, in step 1206, the UE receives the MBMS using another receiver while continuously camping on the serving frequency.

However, if not supported, in step 1204, the UE reconfigures the frequency which provides the MBMS as highest priority, performs inter-frequency cell reselection based on the reconfigured priority in step 1205, camps on a cell which provides the MBMS, and receives the MBMS in step 1206.

A cell reselection method of taking reception of the MBMS of the UE supporting multiple RAT reception into account may be considered. That is, if the UE wishes to receive an LTE MBMS in a state of camping on the cell of the non-LTE frequency and the receiver capabilities of the UE support simultaneous reception of the serving RAT and LTE frequency, the UE does not perform cell reselection at the LTE frequency in order to receive the MBMS, continuously camps on the current cell, receives the MBMS provided at the non-serving frequency with the remaining reception capabilities of the UE.

According to the present invention, since the UE which can receive the MBMS without changing the serving cell continuously camps on the current cell without changing the serving cell depending on whether MBMS can be received, the UE does not unnecessarily move between cells in order to receive the MBMS. In addition, increase in paging and TAU signaling load of the cell providing the MBMS can be minimized.

<Third Embodiment>

When a cell without MBMS service is congested, it is probable that all the neighboring cells also are congested. When a cell with MBMS service is congested, it is probable that all the neighboring cells are not congested.

Therefore, the congestion of a MBMS cell requires different kind of handling. And it was proposed to use priority information to indicate whether a user prefer MBMS service or unicast service.

Priority information is about user's preference of MBMS vs unicast. Before MBMS service start, a user does not know how much the contents of a MBMS service. Thus it will be not easy for a user to decide which service should be prioritized. Also, if a RRC-Connected mode UE is using a non-GBR service, the congestion will have no impact to the UE because eNB will just not schedule the UE.

<Fourth Embodiment>

Before the start of MBMS service, user may not conclude which service should be prioritized. And a user may not know whether his UE is in RRC-connected mode. For example, an application which is running in a background mode may exchange data with a server without any notification to user. For this user, asking the preference of unicast/MBMS will only puzzle a user.

Furthermore, if a user installed a lot of applications into his smart phones and many of these applications are exchanges background data with server, a user will not know which application has generated a data and made the UE move into RRC-Connected mode. In this case, a user may not have any idea on how to decide priorities of MBMS/unicast.

<Fifth Embodiment>

Many background applications of smart phones may put UE into RRC-Connected mode without users' awareness. In this case, users cannot decide priorities of MBMS/Unicast If a RRC-Connected mode UE is using a non-GBR (Guaranteed Bit Rate)service, the congestion will have no impact to the UE because eNB will just not schedule the UE. In this sense, asking the RRC-Connected mode UE with only non-GBR services which service he prefers is nonsense.

On the other hand, due to the QoS characteristics, QoS degradation of GBR bearer matter much. Thus, before shutting-down GBR bearer, eNB needs to know whether user prioritizes MBMS over GBR or not.

<Sixth Embodiment>

User is only needs to decide whether he prefers MBMS service or a GBR service. Typical example of GBR service is voice call. How much a user prefers either voice call or MBMS service depends on:

a) Who the other parties are of voice call.

During a MBMS service, a user may want make an important call. Or, a very important call may arrives in the middle of MBMS service.

b) How much interesting the current part of MBMS service is.

Even though a movie is interesting in general, there are some time periods during which the movie is boring. Also, though a user is excited about the MBMS service before the start of MBMS service, the user may feel no more interest in the middle of the MBMS service. The other way around is also possible.

These two aspects are very important in deciding the relative priority between GBR service and MBMS service. And this information will change dynamically.

<Seventh Embodiment>

User preference can be dynamically changing. One simple way to get priority information from a user is to deliver priority information from UE to eNB when MBMS Interest Information is delivered.

However, as discussed above, the information is not reliable because it changes too often. Rather, the only moment when accurate priority information is needed is when a MBMS cell is congested. Thus, when a cell is congested due to MBMS, eNB can inquire potentially-impacted UEs of whether users prefer MBMS or unicast service.

Consequently, User preference should be acquired for a potentially-will-be-released UEs when congestion is about to occur. This can be done by eNB sending Priority Information Request message. When a UE receives a Priority Information Request from eNB, it should respond by sending Priority Information Response message which includes whether a user prefers MBMS or unicast service.

Figure 13:
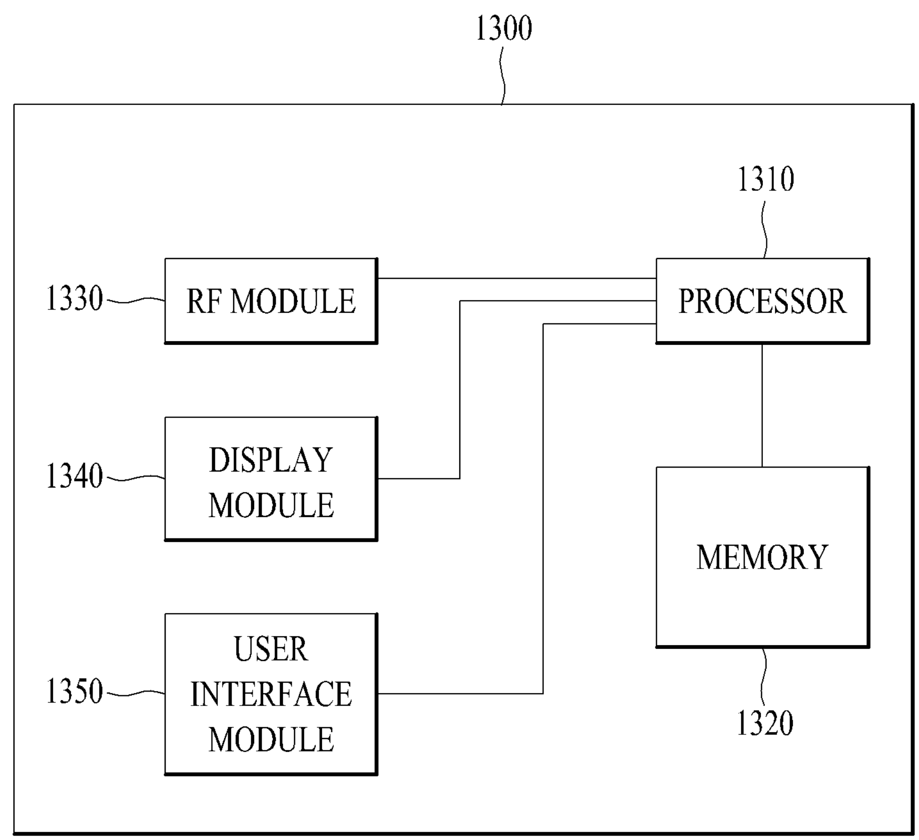
FIG. 13 is a block diagram of a communication apparatus according to an embodiment of the present invention.

FIG. 13 is a block diagram of a communication apparatus according to an embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with respect to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information.

As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method of receiving a service at a user equipment (UE) in a wireless communication system and an apparatus for the same to a 3GPP LTE system is described, the present invention is applicable to various wireless communication systems in addition to the 3GPP LTE system.

The invention claimed is:

1. A method for communicating with a network via a user equipment (UE) in a wireless communication system, the method comprising:

prioritizing a Multimedia Broadcast Multicast Service (MBMS) service above a unicast service;

receiving wait time information from the network when a connection with the network is released, wherein the wait time information defines how long the UE can receive a MBMS service without the connection to the network after the network connection is released; and performing a connection establishment procedure with the network based on the wait time information, wherein performing the connection establishment procedure comprises:

delaying the connection establishment procedure with the network if the UE is receiving a MBMS service without the connection to the network, and performing the connection establishment procedure with the network when either a wait time indicated by the wait time information is expired, even though the UE is receiving the MBMS service without the connection to the network, or when the UE stops receiving the MBMS service.

2. The method of claim 1, wherein the connection with the network is released if a cell providing the MBMS service is congested.

3. The method of claim 1, wherein the wait time information is included in a Radio Resource Control (RRC) connection release message.

4. A method for communicating with a user equipment (UE) via a network in a wireless communication system, the method comprising:

transmitting wait time information to the UE when a connection between the network and the UE is released, wherein the UE prioritizes a Multimedia Broadcast Multicast Service (MBMS) service above a unicast service and wherein the wait time information defines how long the UE can receive a MBMS service without the connection to the network after the network connection is released; and performing a connection establishment procedure with the UE based on the wait time information, wherein the connection establishment procedure with the UE is delayed if the UE is receiving a MBMS service without the connection to the network, and wherein the connection establishment procedure between the network and the UE is performed when either a wait time indicated by the wait time information is expired, even though the UE is receiving the MBMS service without the connection to the network, or when the UE stops receiving the MBMS service.

5. The method of claim 4, wherein the connection between the network and the UE is released if a cell providing the MBMS service is congested.

6. The method of claim 4, wherein the wait time information is included in a Radio Resource Control (RRC) connection release message.

* * * * *